United States Patent
Sleeman

(10) Patent No.: US 8,451,237 B2
(45) Date of Patent: May 28, 2013

(54) SENSITIVITY CONTROL AS A FUNCTION OF TOUCH SHAPE

(75) Inventor: Peter Sleeman, Waterlooville (GB)

(73) Assignee: Atmel Corporation, San Jose, CA (US)

( * ) Notice: Subject to any disclaimer, the term of this patent is extended or adjusted under 35 U.S.C. 154(b) by 361 days.

(21) Appl. No.: 12/498,317

(22) Filed: Jul. 6, 2009

(65) Prior Publication Data

US 2011/0001708 A1    Jan. 6, 2011

(51) Int. Cl.
*G06F 3/045*    (2006.01)

(52) U.S. Cl.
USPC ......... 345/173; 345/174; 345/179; 178/18.01

(58) Field of Classification Search
USPC ............. 345/173–175, 179; 178/18.01, 18.09
See application file for complete search history.

(56) References Cited

U.S. PATENT DOCUMENTS

| | | | | |
|---|---|---|---|---|
| 4,686,332 A | * | 8/1987 | Greanias et al. | 345/173 |
| 4,806,709 A | * | 2/1989 | Evans | 178/18.06 |
| 5,552,568 A | * | 9/1996 | Onodaka et al. | 178/18.03 |
| 7,663,607 B2 | | 2/2010 | Hotelling | |
| 7,875,814 B2 | | 1/2011 | Chen | |
| 7,920,129 B2 | | 4/2011 | Hotelling | |
| 8,031,094 B2 | | 10/2011 | Hotelling | |
| 8,031,174 B2 | | 10/2011 | Hamblin | |
| 8,040,326 B2 | | 10/2011 | Hotelling | |
| 8,049,732 B2 | | 11/2011 | Hotelling | |
| 8,179,381 B2 | | 5/2012 | Frey | |
| 2007/0115265 A1 | * | 5/2007 | Rainisto | 345/173 |
| 2008/0284753 A1 | * | 11/2008 | Hsu et al. | 345/174 |
| 2009/0207145 A1 | * | 8/2009 | Tsuzaki et al. | 345/173 |
| 2009/0315854 A1 | | 12/2009 | Matsuo | |
| 2010/0045627 A1 | * | 2/2010 | Kennedy | 345/173 |
| 2010/0097328 A1 | * | 4/2010 | Simmons et al. | 345/173 |
| 2012/0242588 A1 | | 9/2012 | Myers | |
| 2012/0242592 A1 | | 9/2012 | Rothkopf | |
| 2012/0243151 A1 | | 9/2012 | Lynch | |
| 2012/0243719 A1 | | 9/2012 | Franklin | |

FOREIGN PATENT DOCUMENTS

WO    WO 2012/129247    9/2012

* cited by examiner

*Primary Examiner* — Koosha Sharifi-Tafreshi
(74) *Attorney, Agent, or Firm* — Baker Botts LLP

(57) ABSTRACT

A method and device receives signals from a plurality of nodes about a first touch of an array of touch screen sensor nodes. It is determined whether the received signals are representative of a finger touch or a stylus touch. A detect mode may be entered as a function of the type of touch determined.

24 Claims, 5 Drawing Sheets

SENSITIVITY CONTROL AS A FUNCTION OF TOUCH SHAPE

BACKGROUND

An X-Y touchscreen using a relatively high density array of sensing nodes can easily sense the presence of a finger. In some cases, the nodes may have a center to center pitch of 5 mm or less. Use of a passive stylus on the touchscreen presents a very small detection patch with a relatively weak central signal as compared to a finger touch. For capacitive sensors, the weak signal results from a reduced surface area of the stylus. For optical sensors, there may be less of a dark spot under the stylus tip due to light leakage around the edges of the stylus. A complete shadow may not be observable with the stylus as compared to a finger touch.

In some prior touchscreen devices, different thresholds may be selected depending on whether a finger or a stylus are most likely to be used. The thresholds may be used to determine whether the touchscreen is being initially touched, and results in further touches being detected and interpreted as touches even if they are below the initial threshold. This is referred to as the touchscreen entering a detect mode once it is initially determined that the touchscreen is being touched. The initial threshold may be set according to whether it is expected that a finger or a stylus will be used.

In one prior device, the threshold is a function of the measured capacitance at each node which changes in response to a touch by a finger or stylus. The capacitive measurement is compared to the threshold, and if exceeding the threshold, a detect state is entered. The detect state is maintained as long as the measured capacitive changes on the nodes exceed the threshold. Commonly, the threshold is slightly reduced on entering the detect state to ensure that the detection state is maintained even if the capacitive change drops slightly due to measurement uncertainty or noise for example. The original threshold is restored once the detect state is exited due to removal of the touch. This is a form of hysteresis.

If a user switches between using a finger and a stylus, the initial threshold may not be set appropriately by the user or by the product designer. If the threshold is set for a stylus, the touchscreen may be too sensitive if a finger is used and noise may also result in touches incorrectly being detected. Conversely if the threshold is set to optimal for finger use then it may not detect a stylus consistently, or at all.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, microcontroller, or other type of processor operating on a computer system, such as a personal computer, server or other computer system.

Figure 1:
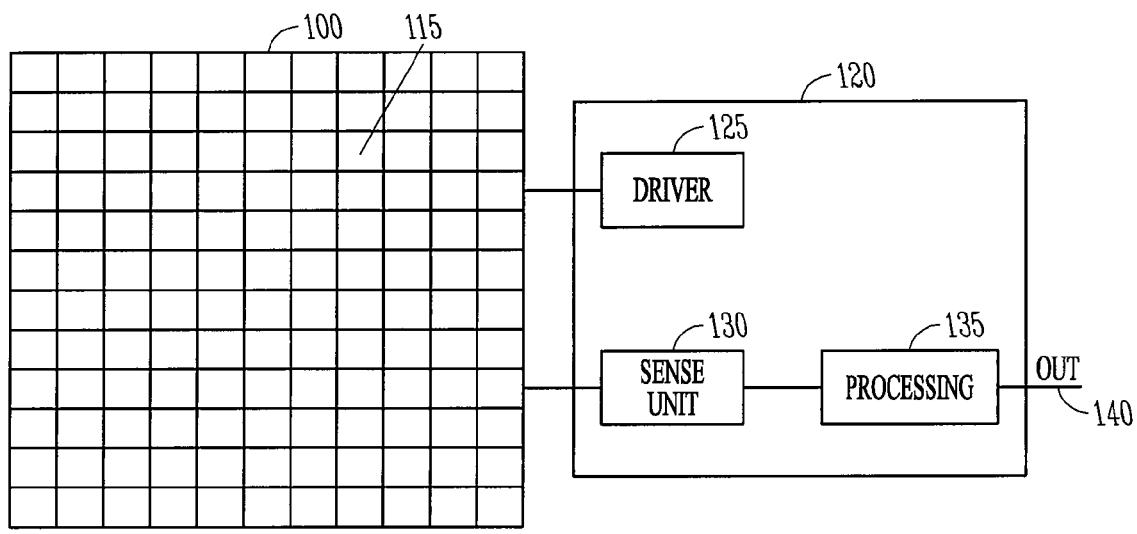
FIG. 1 is a block diagram of a touchscreen system according to an example embodiment.

A touchscreen system is shown generally at 100 in FIG. 1. The system 100 includes a touchscreen 110 having a plurality of sensor nodes 115 to provide signals from the plurality of nodes about a first touch of an array of touch screen sensor nodes 115. A controller 120 is communicatively coupled to the touchscreen sensor nodes 115 to receive the signals and determine whether the received signals are representative of a finger touch or a stylus touch, and to enter a detection mode as a function of the type of touch determined.

In one embodiment, controller 120 includes a driver 125 that drives the touchscreen with electrical pulses in the case of one type of capacitive based touchscreen. Many different methods may be used to sense a touch and determine its location in a capacitive based touchscreen. When a finger or stylus or other device is touching the screen, the transfer of charge responsive to the touch may be received from one or more nodes, such as at a sense unit 130 that may measure the transferred charge at each node to determine whether or not a touch has occurred at each node. In one embodiment, the number of pulses required for the transferred charge to accumulate to a threshold determines whether or not a touch occurred. In further embodiments, the sense unit 130 may be used to otherwise measure a change in capacitance caused by a touch, and convert the measured change into a digital signal.

In still further embodiments, optical based touchscreens may be utilized that use an array of light detectors to determine whether a touch occurs. Where the touch occurs, light is blocked from reaching the light detectors, and the array of sensors is used to identify areas or nodes where light is blocked. In both capacitive and optical sensors, nodes of the touchscreen may indicate a full touch, or a partial touch.

Processing circuitry 135, such as a software controlled microcontroller, or other hardware, software and firmware combinations, may be used to process information corresponding to the full and partial touches to provide an output 140 representative of the touches.

Figure 2:
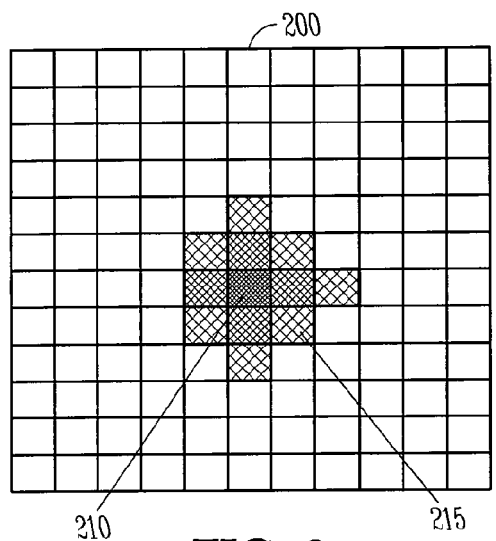
FIG. 2 is a block diagram illustrating a touch signature shape according to a example embodiment.
Figure 3:
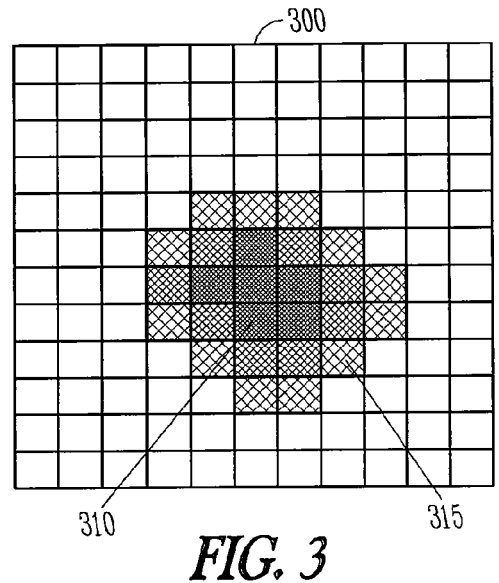
FIG. 3 is a block diagram illustrating a further touch signature shape according to a example embodiment.
Figure 4:
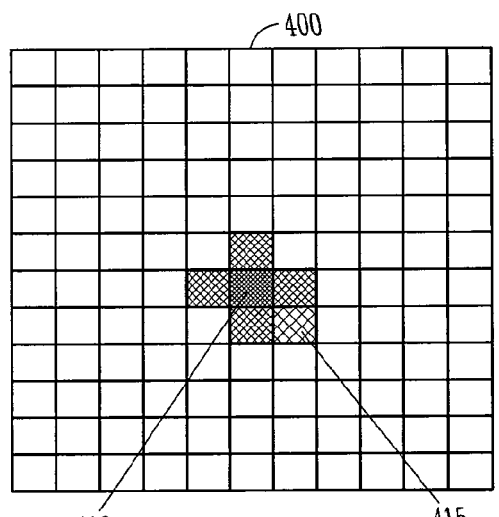
FIG. 4 is a block diagram illustrating yet a further touch signature shape according to a example embodiment.

FIGS. 2, 3 and 4 are block diagram representations of nodes on a touchscreen and the signals corresponding to touch signatures generated at each node responsive to different types of touches. FIG. 2 at 200 illustrates a shape of a small finger touch signature. Where the finger direction contacts the nodes, a strong signal is generated at such nodes as indicated at 210, forming a strong center peak signal. Surrounding the strong center peak 210, are nodes that form a halo region 215, which generally have a weaker signal, as the finger starts to lose contact with nodes in the halo region due to the domed nature of fingers. For a small finger, the center peak 210 may be fairly small, corresponding to one or more nodes being fully contacted by the small finger.

In FIG. 3, a large finger touch is illustrated at 300. With a larger finger touch, as compared to the small finger touch, the signature may exhibit a center peak 310 that may include more nodes as illustrated, since the larger finger is more likely to contact several nodes. Further, a larger halo region 315 may also be prevalent. The halo region 315 may be larger due to the larger radius of the dome of the larger finger, causing it to contact and affect a larger number of halo nodes.

FIG. 4 represents a stylus touch at 400. In one embodiment, a stylus generates a signature that corresponds to a sharply defined, small touching object, such as a flat tip of an end of a passive stylus. As shown at 400, a center peak 410 is small, such as one node, or perhaps two adjacent nodes with one-half signal intensity. The center peak 410 may represent a weaker signal due to the sharply defined touching object. This corresponds to a well defined tip that may be similar in size to the node size, or smaller than a node size. In further embodiments, the relative density of the nodes compared to the size of the touching object may result in more nodes being included in the center peak. A halo region 415

Once the shape of the signature is determined, controller 120 may either enter a detect mode of operation if the touching object is a finger, or based on the type of signature, modify an internal detection threshold for entering the detect mode. Once in the detect mode, the controller interprets additional touches with a reduced threshold, as such touches are more likely to not correspond to noise, and be actual touches. If a stylus shape is detected, the internal detection threshold may be lowered. If a very small finger, such as a child's finger is detected, the internal detection threshold may also be lowered.

In one embodiment, the nodes are pulsed with electrical signals in order to access the capacitance of each node, and the signature is comprised of change of capacitance for each node. The greater the contact of a touch with a node, the greater the change detected in the central nodes, up to some maximum possible change that is determined by the physical size of node compared with the touching object and the physical arrangement of the electrodes around the node. The greater the contact the more nodes that will have significant changes. The detection threshold may thus be set to a capacitance change or "signal" in one embodiment, looking at the strongest signals present across all nodes measured. In a further embodiment, optical touchscreens may also use the change in electrical output from photosensors to set a detection threshold in a similar way.

Figure 5:
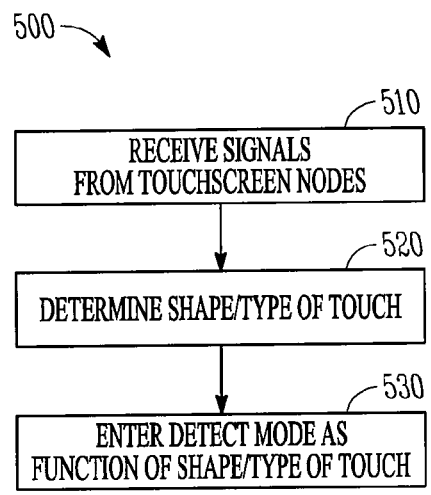
FIG. 5 is a flowchart illustrating a method of detecting touches according to a example embodiment.

A flowchart in FIG. 5 represents a method of entering a detect mode as a function of a type of touch generally at 500. At 510, signals are received from a plurality of nodes about a first touch of an array of touch screen sensor nodes. At 520, it is determined whether the received signals are representative of a finger touch or a stylus touch. At 530, a detect mode is entered as a function of the type of touch determined. In one embodiment, the type of touch is determined from a signature shape generated from signals received from the nodes.

If the received signals have a strong center peak surrounded by a halo region, the shape is representative of a finger touch. A small finger touch corresponds to received signals having a slightly smaller center peak and halo region than a large finger touch. In one embodiment, received signals having a shape with a slightly weaker center peak as compared to a finger touch, and small halo are representative of a stylus touch. In one embodiment, an internal detection threshold is set to be more sensitive when a stylus touch signature shape is encountered such that the touchscreen enters a detect mode wherein a lowered detection threshold is used to detect further touches consistent with the first touch. In one embodiment, the detect mode lower detection threshold is used for a predetermined amount of time following the first touch.

Figure 6:
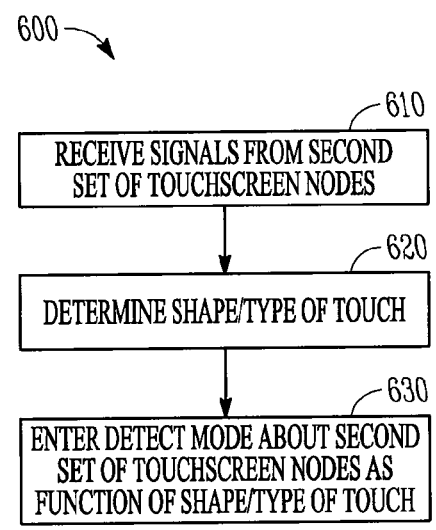
FIG. 6 is a flowchart illustrating a method of detecting further touches according to a example embodiment.

In further embodiments, the detect mode is used for a localized set of nodes proximate the first touch. In this manner one or more localized sets of nodes may be in independent detect modes for multiple touch situations. Such a multiple touch situation may result when a second touching object separated from the first touching object is used at the same time as the first touching object. As illustrated in a flowchart of FIG. 6, the controller implements a method 600. The controller receives signals from a plurality of nodes about a second touch of the array of touch screen sensor nodes physically separated from the first touch as indicated at 610. The controller determines whether the received signals from the second touch are representative of a finger touch or a stylus touch, and enters a detect mode as a function of the type of the second touch determined such that multiple detect modes having lower detection thresholds are localized about the array of touch screen sensors.

Figure 7:
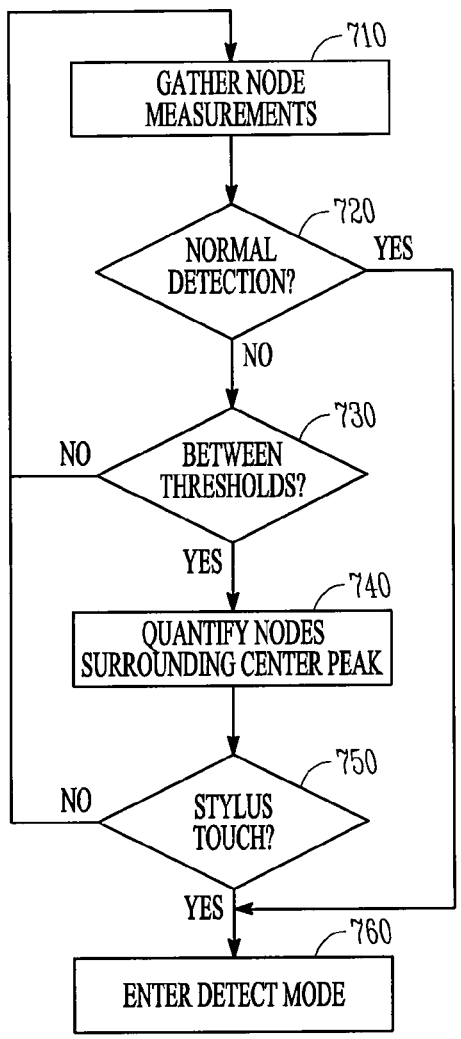
FIG. 7 is a flowchart illustrating further details of a method of detecting touches according to a example embodiment.

FIG. 7 is a flowchart illustrating a method 700 of a touchscreen entering a detect mode as a function of the type or signature shape. At 710, node measurements are gathered, such as by scanning the nodes of the touchscreen. If a normal touch is not detected at 720, a check is made to determine whether the signals detected from the nodes is between a normal threshold and a stylus touch threshold at 730. The signals may correspond to a center peak in one embodiment. If the signals detected are lower than the stylus touch threshold 730, no touch has been detected, and further node measurements are gathered at 710.

If the signals detected are between the normal threshold and noise threshold at 730, the nodes surrounding the center peak are quantified at 740. Using the quantification of the nodes surrounding the center peak, a shape of a halo around the center peak may be identified, and at 750, it is determined whether the detected signals correspond to a stylus touch. If so, a detect mode is entered at 760. If a normal detection occurred at 720, the detect mode at 760 is also entered, wherein further touches are detected with a lower threshold. If the detected signals do not correspond to a stylus touch, or other type of known touch have known shapes, the signals are not interpreted as representative of a touch, and the method 700 continues with gathering node measurements at 710.

In one embodiment, the shape includes both the center peak and the halo of a set of signals from nodes of the touchscreen. Several different methods may be used to quantify and analyze the signature of a suspected touch. In one embodiment, a statistical distribution of signals may be used. An array with signal weighting may be used in one embodiment and compared to known arrays to determine the type of touch corresponding to the signals received. In further embodiments, the center peak may be correlated to other known center peaks, and the halo may be used to determine whether the halo is consistent with the type of center peak identified.

Figure 8:
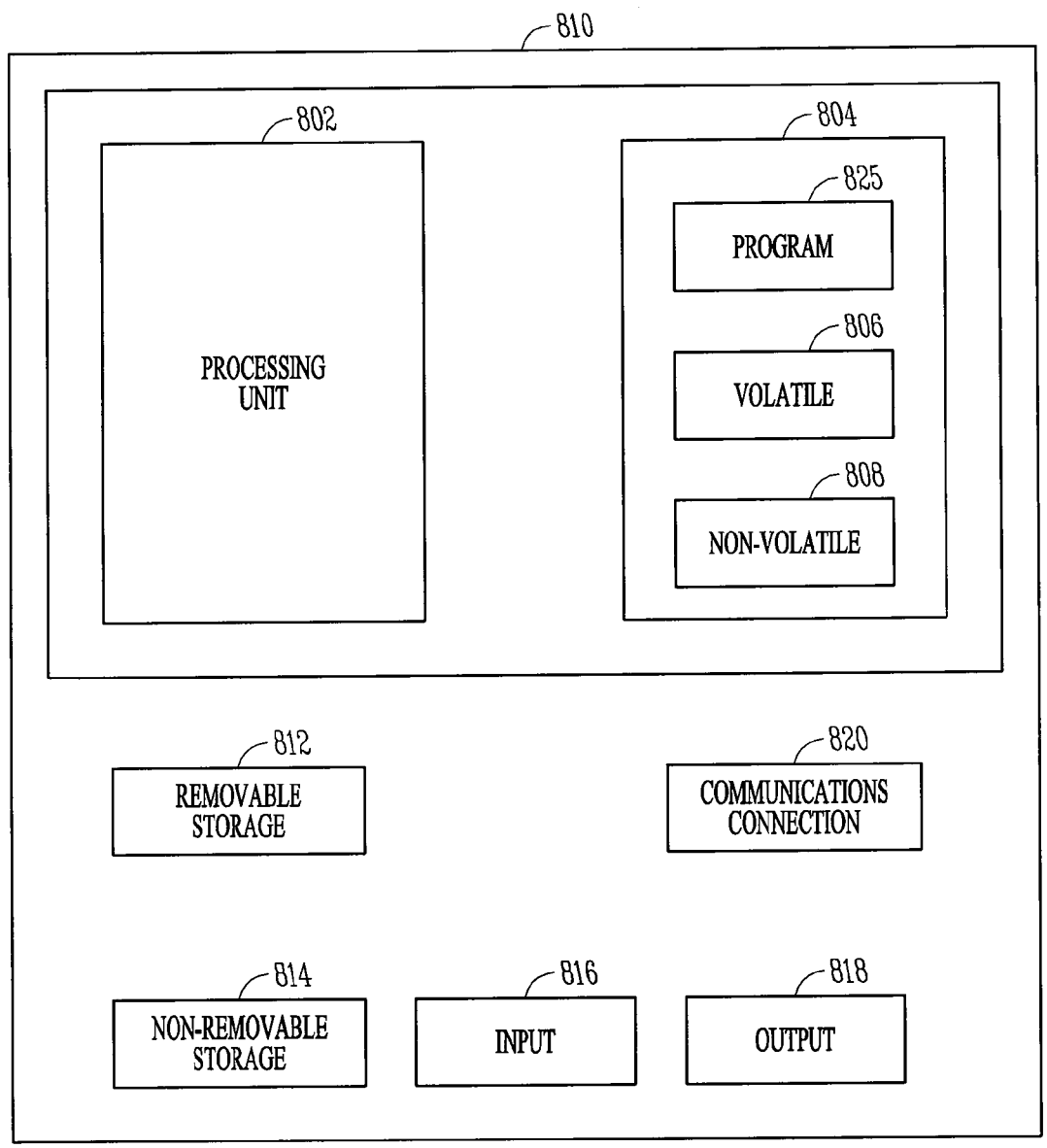
FIG. 8 is a block diagram of a controller for executing methods according to an example embodiment.

A block diagram of a computer system, such as a microcontroller that executes programming for performing the above algorithm is shown in FIG. 8. A general computing device in the form of a computer 810, may include a processing unit 802, memory device 804, removable storage 812, and non-removable storage 814. Memory 804 may include volatile memory 806 and non-volatile memory 808. Computer 810 may include—or have access to a computing environment that includes—a variety of computer-readable media storage devices, such as volatile memory 806 and non-volatile memory 808, removable storage 812 and non-removable storage 814. Computer storage may include one or more of a random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a computer-readable medium.

The invention claimed is:

1. A machine implemented method comprising:
receiving signals from a plurality of nodes about a first touch of an array of touch screen sensor nodes;
determining, using a first detection threshold, whether the received signals are representative of a finger touch or a stylus touch; and
entering a detect mode as a function of whether the received signals are determined to be representative of a finger touch or a stylus touch, the detect mode comprising a mode in which subsequent touches are interpreted with a second threshold that is lower than the first detection threshold;
wherein the first and second thresholds each represent a corresponding capacitance.

2. The method of claim 1 comprising determining, when the received signals have a strong center peak surrounded by a halo region, that the received signals are representative of a finger touch.

3. The method of claim 2 wherein a small finger touch corresponds to received signals having a slightly smaller center peak and halo region than a large finger touch.

4. The method of claim 2 comprising determining, when the received signals have a slightly weaker center peak as compared to a finger touch and small halo, that the received signals are representative of a stylus touch.

5. The method of claim 1 wherein the first detection threshold is set to be more sensitive for a stylus touch than for a finger touch.

6. The method of claim 1 comprising using the second detection threshold to detect further touches consistent with the first touch.

7. The method of claim 6 comprising using the second detection threshold for a predetermined amount of time following the first touch.

8. The method of claim 1 wherein the second detection threshold is localized to sensor nodes proximate the first touch.

9. The method of claim 8 and further comprising:
receiving signals from a plurality of nodes about a second touch of the array of touch screen sensor nodes physically separated from the first touch;
determining whether the received signals from the second touch are representative of a finger touch or a stylus touch; and
entering a detect mode as a function of the type of the second touch determined such that multiple detection thresholds are localized about the array of touch screen sensors.

10. A machine implemented method comprising:
detecting, based on scanning nodes in an array of touch screen sensor nodes, a touch associated with one or more signals;
interpreting, when the one or more signals are above a first detection touch threshold, the touch as a finger touch;
quantifying, when the one or more signals are below the first detection touch threshold but above a second detection touch threshold, nodes surrounding a particular node associated with the touch;
interpreting, when the quantification of the surrounding nodes is indicative of a stylus touch, the touch as a stylus touch; and
entering a detect mode as a function of whether the touch is interpreted as a finger touch or a stylus touch, the detect mode comprising a mode in which subsequent touches are interpreted with a third detection touch threshold that is lower than the first detection touch threshold;
wherein the first and second thresholds each represent a corresponding capacitance.

11. The method of claim 10 wherein quantifying surrounding nodes comprises quantifying a center of the touch and quantifying a halo around the center of the touch.

12. The method of claim 11 wherein the quantification of the center of the touch and the halo comprise a shape of the touch.

13. The method of claim 12 wherein the shape of the touch is compared to known shapes of finger touches and stylus touches to determine the type of touch.

14. The method of claim 12 wherein the shape of the touch is compared to known statistical distributions of signals associated with known shapes of touches to determine the type of touch.

15. The method of claim 12 wherein the shape of the touch is correlated to a signal weighting matrix to determine the type of touch.

16. A system comprising:
a touchscreen having a plurality of sensor nodes to provide signals from the plurality of nodes about a first touch of an array of touch screen sensor nodes;
a controller communicatively coupled to the touchscreen sensor nodes, the controller configured to:
receive the signals;
determine, using a first detection threshold, whether the received signals are representative of a finger touch or a stylus touch; and
enter a detect mode as a function of the type of touch determined, the detect mode comprising a mode in which subsequent touches are interpreted with a second threshold that is lower than the first detection threshold;
wherein the first and second thresholds each represent a corresponding capacitance.

17. The system of claim 16 wherein the controller further is coupled to the nodes and is configured to:

receive signals from a plurality of nodes about a second touch of the array of touch screen sensor nodes physically separated from the first touch;

determine whether the received signals from the second touch are representative of a finger touch or a stylus touch; and set an internal detection threshold as a function of the type of the second touch determined such that multiple detection thresholds are localized about the array of touch screen sensors.

18. The system of claim 16 wherein the controller is configured to determine, when the received signals have a strong center peak surrounded by a halo region, that the received signals are representative of a finger touch.

19. The system of claim 18 wherein a small finger touch corresponds to received signals having a slightly smaller center peak and halo region than a large finger touch.

20. The system of claim 18 wherein the controller is configured to determine, when the received signals have a slightly weaker center peak as compared to a finger touch and small halo, that the received signals are representative of a stylus touch.

21. The system of claim 16 wherein the first detection threshold is set to be more sensitive for a stylus touch than for a finger touch.

22. The system of claim 16 wherein the controller is configured to use the second detection threshold to detect further touches consistent with the first touch.

23. The system of claim 22 wherein the controller is configured to use the second detection threshold for a predetermined amount of time following the first touch.

24. The system of claim 16 wherein the second detection threshold is localized to sensor nodes proximate the first touch.

* * * * *